United States Patent
Oriordan et al.

(10) Patent No.: US 10,521,535 B2
(45) Date of Patent: *Dec. 31, 2019

(54) REUSE OF EXTRACTED LAYOUT-DEPENDENT EFFECTS FOR CIRCUIT DESIGN USING CIRCUIT STENCILS

(71) Applicant: Synopsys, Inc., Mountain View, CA (US)

(72) Inventors: Donald John Oriordan, Sunnyvale, CA (US); Friedrich Gunter Kurt Sendig, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 15/809,855

(22) Filed: Nov. 10, 2017

(65) Prior Publication Data

US 2018/0068036 A1    Mar. 8, 2018

Related U.S. Application Data

(63) Continuation of application No. 15/442,338, filed on Feb. 24, 2017, now Pat. No. 10,078,715, and a
(Continued)

(51) Int. Cl.
*G06F 17/50* (2006.01)
*H03K 19/00* (2006.01)

(52) U.S. Cl.
CPC ........ *G06F 17/504* (2013.01); *G06F 17/5036* (2013.01); *G06F 17/5068* (2013.01);
(Continued)

(58) Field of Classification Search
CPC ............ G06F 17/5081; G06F 17/5072; G06F 17/5045; G06F 17/5068; G06F 17/5036;
(Continued)

(56) References Cited

U.S. PATENT DOCUMENTS

| 5,095,441 A | 3/1992 | Hopper et al. |
| 6,662,149 B1 | 12/2003 | Devgan et al. |

(Continued)

FOREIGN PATENT DOCUMENTS

| CN | 105224709 A | 1/2016 |
| KR | 10-2004-0048736 A | 6/2004 |

OTHER PUBLICATIONS

PCT International Search Report and Written Opinion, PCT Application No. PCT/US17/19401, dated May 5, 2017, 17 pages.
(Continued)

*Primary Examiner* — Vuthe Siek
(74) *Attorney, Agent, or Firm* — Fenwick & West LLP

(57) ABSTRACT

A method for reuse of extracted layout-dependent effects for circuit design using circuit stencils includes receiving a schematic of an integrated circuit including a circuit segment. A circuit stencil corresponding to the circuit segment is instantiated in a schematic of a second integrated circuit. The circuit stencil includes layout-dependent effects information for the circuit segment extracted from a layout of the first integrated circuit. Simulation is performed on the schematic of the second integrated circuit using the layout-dependent effects information for the circuit segment. A layout of at least a portion of the second integrated circuit corresponding to the circuit segment is generated responsive to performing the simulation.

17 Claims, 6 Drawing Sheets

Related U.S. Application Data continuation of application No. 15/442,019, filed on Feb. 24, 2017, now Pat. No. 10,102,324.

(60) Provisional application No. 62/300,594, filed on Feb. 26, 2016, provisional application No. 62/299,968, filed on Feb. 25, 2016.

(52) U.S. Cl.
CPC ...... *G06F 17/5072* (2013.01); *G06F 17/5077* (2013.01); *G06F 17/5081* (2013.01); *H03K 19/00* (2013.01); *G06F 2217/06* (2013.01); *G06F 2217/66* (2013.01); *G06F 2217/74* (2013.01)

(58) Field of Classification Search
CPC .............. G06F 17/5022; G06F 17/504; G06F 17/5077; G06F 2217/06; G06F 2217/10; G06F 2217/66; G06F 2217/74; G06F 17/50; H03K 19/00
See application file for complete search history.

(56) References Cited

U.S. PATENT DOCUMENTS

| | | | |
|---|---|---|---|
| 6,968,524 | B2 | 11/2005 | Jiang et al. |
| 7,184,040 | B1 | 2/2007 | Tzvetkov |
| 7,496,884 | B2 | 2/2009 | Fang et al. |
| 7,579,606 | B2 | 8/2009 | Yoshida et al. |
| 7,620,743 | B2 | 11/2009 | Gehman et al. |
| 7,877,376 | B2 | 1/2011 | Thiyagarajan et al. |
| 7,900,174 | B2 | 3/2011 | Shankar et al. |
| 8,037,433 | B2 | 10/2011 | Chidambarrao et al. |
| 8,112,729 | B2 | 2/2012 | Tonti et al. |
| 8,316,335 | B2 | 11/2012 | Barowski et al. |
| 8,443,329 | B2 | 5/2013 | McConaghy |
| 8,533,650 | B2 | 9/2013 | Arsintescu et al. |
| 8,621,409 | B2 | 12/2013 | Lee et al. |
| 8,732,640 | B1 | 5/2014 | Krishnan et al. |
| 8,739,124 | B2 | 5/2014 | Ritter et al. |
| 8,745,571 | B2 | 6/2014 | Li et al. |
| 8,769,456 | B1 | 7/2014 | Krishnan et al. |
| 8,789,008 | B2 | 7/2014 | Chen |
| 9,262,578 | B2 | 2/2016 | Wang et al. |
| 9,779,193 | B1 | 10/2017 | Ginetti et al. |
| 10,102,324 | B2 | 10/2018 | Oriordan et al. |
| 2004/0243373 | A1* | 12/2004 | Sercu .................. G06F 17/5036 703/14 |
| 2007/0055953 | A1 | 3/2007 | Fang et al. |
| 2007/0268731 | A1 | 11/2007 | Weiland et al. |
| 2008/0128637 | A1 | 6/2008 | Yoshida et al. |
| 2009/0288055 | A1 | 11/2009 | Shankar et al. |
| 2010/0050138 | A1 | 2/2010 | Chidambarrao et al. |
| 2010/0269075 | A1 | 10/2010 | Tonti et al. |
| 2012/0066542 | A1 | 3/2012 | Chen et al. |
| 2012/0066659 | A1 | 3/2012 | Chen et al. |
| 2012/0210283 | A1 | 8/2012 | Li et al. |
| 2013/0290916 | A1* | 10/2013 | Lee ..................... G06F 17/5036 716/102 |
| 2014/0007051 | A1 | 1/2014 | Ritter et al. |
| 2015/0154333 | A1 | 6/2015 | Chai et al. |
| 2015/0310158 | A1 | 10/2015 | Wang et al. |
| 2016/0125115 | A1* | 5/2016 | Strang ................. G06F 17/5045 716/116 |
| 2016/0140279 | A1 | 5/2016 | Zhu et al. |
| 2017/0169146 | A1 | 6/2017 | Chen et al. |

OTHER PUBLICATIONS

PCT International Search Report and Written Opinion, PCT Application No. PCT/US17/19466, dated May 8, 2017, 16 pages.
United States Office Action, U.S. Appl. No. 15/442,338, dated Jan. 26, 2018, 10 pages.
United States Office Action, U.S. Appl. No. 15/442,019, dated Jan. 19, 2018, 11 pages.
The Patent Office of the People's Republic of China, Notification of the First Office Action, CN Patent Application No. 201780001297. 5, dated Oct. 8, 2018, 8 pages.
Kundert, K. et al., "Design of Mixed-Signal Systems-on-a-Chip," IEEE Transactions on CAD of ICs and Systems, Dec. 2000, pp. 1561-1571, vol. 19, No. 12.
European Extended Search Report, European Application No. 17757322. 7, dated Jun. 4, 2018, 12 pages.
Liao, T. et al., "Analog Integrated Circuit Sizing and Layout Dependent Effects: A Review," Microelectronics and Solid State Electronics, Jan. 2014, pp. 17-29, vol. 3 (1A), [Online] [Retrieved on Apr. 5, 2018] Retrieved from the Internet<URL:http://www.sapub.org/global/showpaperpdf.aspx?doi=10.5923/s.msse.201401.03>.
European Extended Search Report, European Application No. 17757357. 3, dated Jun. 11, 2018, 11 pages.
Naiknaware, R. et al., "Schematic Driven Module Generation for Analog Circuits with Performance Optimization and Matching Considerations," Proceedings of the IEEE 1998 Custom Integrated Circuits Conference, May 11, 1998, pp. 481-484.
Rencher, M. et al., "Full Custom Layout Design Automation Using Schematic Driven Layout," 8182 Motorola Technical Developments, Dec. 1991, pp. 17-20, vol. 14.

\* cited by examiner

… (1) …

REUSE OF EXTRACTED LAYOUT-DEPENDENT EFFECTS FOR CIRCUIT DESIGN USING CIRCUIT STENCILS

CROSS REFERENCE TO RELATED APPLICATION

This application is a continuation of U.S. application Ser. No. 15/442,019, filed Feb. 24, 2017, now U.S. Pat. No. 10,102,324, which claims the benefit of U.S. Provisional Application No. 62/299,968, filed Feb. 25, 2016 and U.S. Provisional Application No. 62/300,594, filed Feb. 26, 2016, both of which are incorporated by reference in their entirety. This application is also a continuation of U.S. application Ser. No. 15/442,338, filed Feb. 24, 2017, now U.S. Pat. No. 10,078,715, which claims the benefit of U.S. Provisional Application No. 62/299,968, filed Feb. 25, 2016 and U.S. Provisional Application No. 62/300,594, filed Feb. 26, 2016, both of which are incorporated by reference in their entirety.

BACKGROUND

Field of the Disclosure

The present disclosure generally relates to designing of integrated circuits, and specifically to reuse of extracted layout-dependent effects (LDE) for circuit design using circuit stencils.

Description of the Related Arts

A design flow for integrated circuits typically includes the steps of transistor-level design and simulation to generate a clean schematic design. The design flow further includes creating a layout for the simulated schematic and running layout-vs-schematic (LVS) checks and design rule checks (DRC) on the layout. LVS refers to determining whether a particular integrated circuit layout corresponds to the original schematic design, while DRC refers to determines whether the physical layout of a particular chip satisfies a series of recommended parameters called design rules. Once the layout is determined to be LVS and DRC clean, layout-dependent effects (LDE) information such as for circuit parasitics (e.g., capacitance of wires) may be extracted from the layout. The LDE information may be back-annotated to the pre-layout schematic, and a re-simulation is performed to determine the impact of the LDE on the design performance. The LDE information extraction, back-annotation, and re-simulation often lead to design changes, which lead to additional layout changes, which in turn lead to more design iterations. This phenomenon becomes worse at smaller geometry processes, where impacts of LDE on integrated circuit designs are higher.

SUMMARY

Embodiments relate to the reuse of extracted LDE information for circuit design using circuit stencils. LDE information for circuit segments is extracted from layouts to generate circuit stencils. The circuit stencils are instantiated in a schematic of an integrated circuit. Simulations are performed on the schematic using the LDE information for the circuit segments without generating a layout of the integrated circuit.

In one embodiment, a schematic of a first integrated circuit including a circuit segment is received. A circuit stencil corresponding to the circuit segment is instantiated in a schematic of a second integrated circuit. The circuit stencil includes layout-dependent effects information for the circuit segment extracted from a layout of the first integrated circuit. Simulation is performed on the schematic of the second integrated circuit using the layout-dependent effects information for the circuit segment. A layout of at least a portion of the second integrated circuit corresponding to the circuit segment is generated responsive to performing the simulation.

In one embodiment, a schematic of a first integrated circuit including a circuit segment is received. Simulation is performed on a schematic of a second integrated circuit containing the circuit segment by at least referencing LDE information for the circuit segment in a circuit stencil corresponding to the circuit segment. The LDE information for the circuit segment is extracted from a layout of the first integrated circuit. A layout of at least a portion of the second integrated circuit corresponding to the circuit segment is generated responsive to performing the simulation.

In one embodiment, the LDE includes one or more of parasitics for components and nodes of the circuit segment, polysilicon spacing and polysilicon length effects for the components of the circuit segment, shallow trench isolation effects for the components of the circuit segment, and well proximity effects for the components of the circuit segment.

In one embodiment, the extracting of the LDE information for the circuit segment includes extracting LDE information for the first integrated circuit from the layout of the first integrated circuit. The extracted LDE information for the first integrated circuit is filtered to identify LDE information corresponding to components and nodes in the circuit segment.

In one embodiment, the filtering of the extracted LDE information includes parsing the extracted LDE information for the first integrated circuit to build a parse tree. The parse tree is traversed and LDE information not corresponding to components and nodes in the circuit segment is removed. Remaining LDE information is written into the circuit stencil.

In one embodiment, names of components and nodes of the circuit segment are normalized in the schematic of the first integrated circuit for inclusion in the circuit stencil.

In one embodiment, layer map information is extracted from the layout of the first integrated circuit and the layer map information is written into the circuit stencil.

In one embodiment, instantiating the circuit stencil includes generating a mapping for the schematic of the second integrated circuit. The mapping associates actual names of components and nodes in the schematic of the second integrated circuit with normalized names in the circuit stencil.

In one embodiment, instantiating the circuit stencil includes rescaling the LDE information for the circuit segment in the circuit stencil using layer map information in the circuit stencil and manufacturing information including layer-specific factors for the second integrated circuit.

In one embodiment, the circuit segment corresponds to one or more circuit stencils. Each circuit stencil corresponds to a distinct physical implementation of the circuit segment.

In one embodiment, simulation is performed on a schematic of the second integrated circuit using LDE information in the circuit stencil for each circuit stencil corresponding to the circuit segment. One of the one or more circuit stencils are selected based on the simulation for instantiating the selected circuit stencil in the schematic of the second integrated circuit.

In one embodiment, the simulation on the schematic of the second integrated circuit is performed without generating a layout of the second integrated circuit.

In one embodiment, a layout of the first integrated circuit is generated. The LDE information for the circuit segment is extracted from the layout of the first integrated circuit.

BRIEF DESCRIPTION OF THE DRAWINGS

The teachings of the embodiments of the present invention can be readily understood by considering the following detailed description in conjunction with the accompanying drawings.

The figures depict various embodiments of the present invention for purposes of illustration only. One skilled in the art will readily recognize from the following discussion that alternative embodiments of the structures and methods illustrated herein may be employed without departing from the principles described herein.

DETAILED DESCRIPTION

In the following description of embodiments, numerous specific details are set forth in order to provide more thorough understanding. However, note that the present invention may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments relate to the reuse of extracted LDE information for circuit design using a circuit stencil. LDE information for a circuit segment is extracted from a layout and included in a circuit stencil. Using the circuit stencil, a corresponding circuit segment can be instantiated in a schematic of an integrated circuit. A more accurate simulation on the schematic can be performed using the LDE information, which results in fewer iterations of design changes to the integrated circuit.

A circuit stencil described herein refers to a design abstraction of a circuit segment containing a representation of reduced connectivity information for the circuit segment and LDE information for components and nodes associated with the circuit segment. The circuit stencil may also contain design constraints or normalized names of components and nodes of the circuit segment.

Overview of EDA Design Flow

Figure 1:
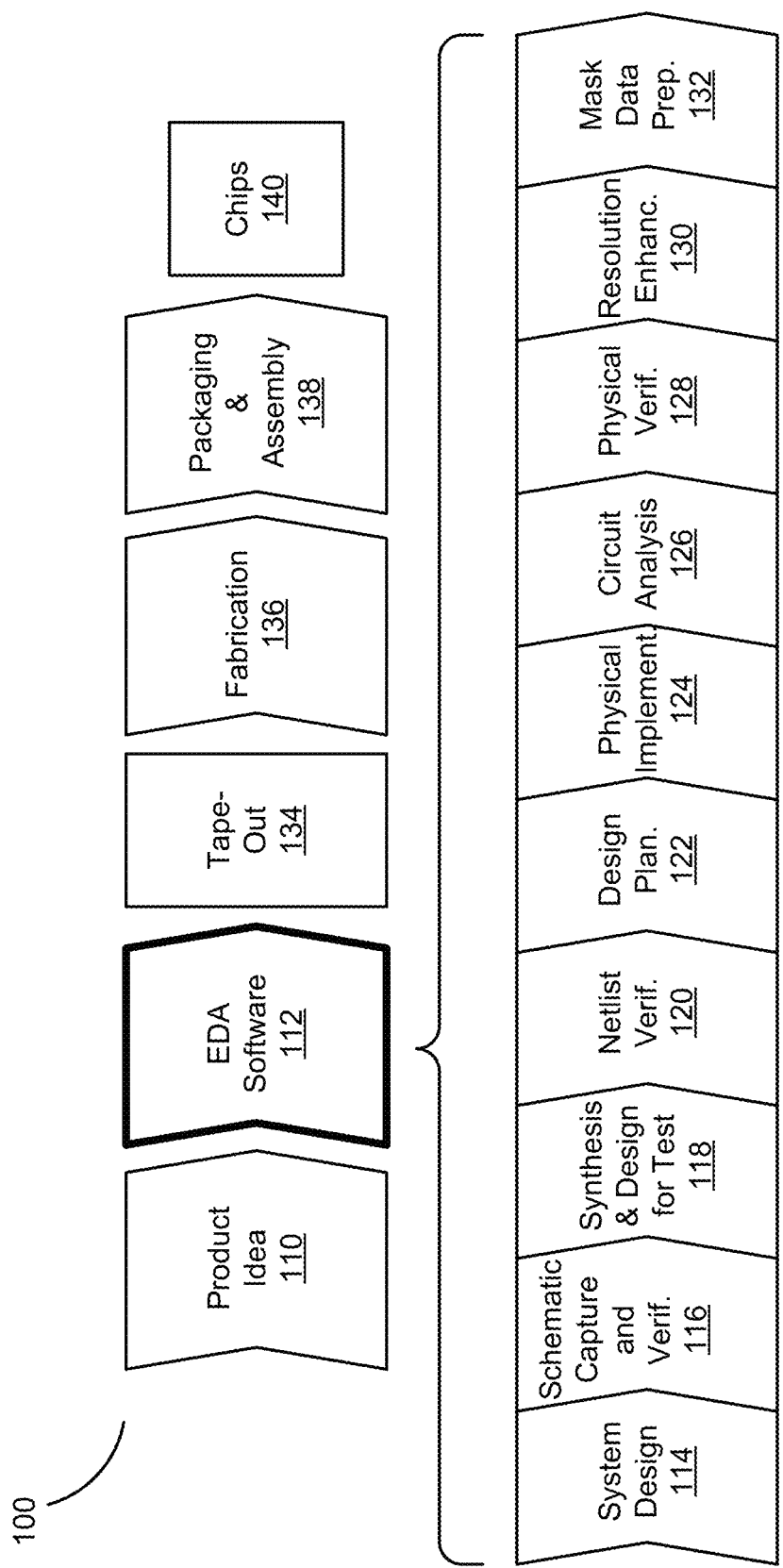
FIG. 1 is an example flow illustrating various operations for designing and fabricating an integrated circuit, in accordance with an embodiment.

FIG. 1 is an example flow 100 illustrating various operations for designing and fabricating an integrated circuit, in accordance with an embodiment. The design process 100 starts with the generation of a product idea 110, which is realized during a design process that uses electronic design automation (EDA) software 112. When the design is finalized, it can be taped-out 134. After tape-out 134, a semiconductor die is fabricated 136 to form the various objects (e.g., gates, metal layers, vias) in the integrated circuit design. Packaging and assembly processes 138 are performed, which result in finished chips 140.

The EDA software 112 may be implemented in one or more computing devices such as the computing device 200, illustrated and described below with reference to FIG. 2. For example, the EDA software 112 is stored as instructions in a computer-readable medium which are executed by a processor for performing operations 114-132 of the design flow, which are described below. This design flow description is for illustration purposes. In particular, this description is not meant to limit the present disclosure. For example, an actual integrated circuit design may require a designer to perform the design operations in a different sequence than the sequence described herein.

During system design 114, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During schematic capture and verification 116, VHDL or Verilog code for modules in the circuit are written and the design is checked for functional accuracy. More specifically, the design is checked to ensure that it produces the correct outputs. Example EDA software products from Synopsys, Inc. of Mountain View, Calif. that can be used at this stage include: Custom Compiler®, VCS®, Vera®, 10 Designware®, Magellan®, Formality®, ESP® and Leda® products.

During synthesis and design for test 118, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Custom Compiler®, Design Compiler®, Physical Compiler®, Test Compiler®, Power Compiler®, FPGA Compiler®, Tetramax®, and Designware® products.

During netlist verification 120, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 122, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 124, the placement (positioning of circuit elements) and routing (connection of the same) occurs. Example EDA software products from Synopsys, Inc. of Mountain View, Calif. that can be used at this stage include: Custom Compiler, the Astro® and IC Compiler® products. Embodiments described herein relate primarily to the physical implementation 124.

During circuit analysis 126, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products. During physical verification 128, the design is checked to ensure correctness for: manufacturing, electrical issues, lithographic issues, and circuitry.

During resolution enhancement 130, geometric manipulations of the layout are performed to improve manufacturability of the design. Example EDA software products from Synopsys, Inc. of Mountain View, Calif. that can be used at this stage include: Proteus®, Proteus®AF, and PSMGED® products.

During mask-data preparation 132, the 'tape-out' data for production of masks to produce finished chips is provided. Example EDA software products from Synopsys, Inc. of Mountain View, Calif. that can be used at this stage include the CATS® family of products.

Formal verification may be performed at the stage of logic design and functional verification 116. Low power design specification is typically processed during stages synthesis and design for test 118 or netlist verification 120.

Example Computing Device

Figure 2:
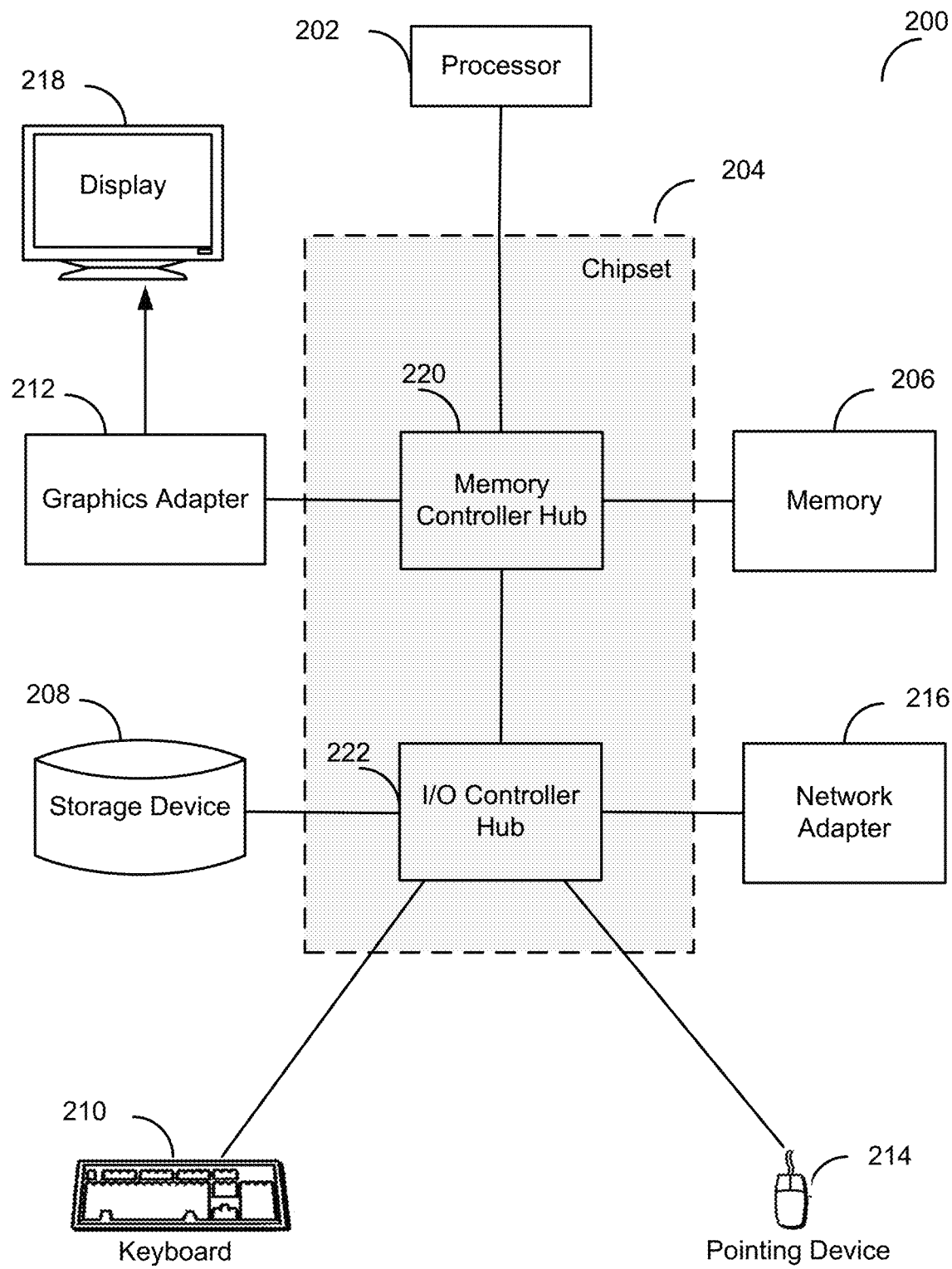
FIG. 2 is a high-level block diagram illustrating an example computing device for performing custom designing of a circuit, in accordance with an embodiment.

FIG. 2 is a high-level block diagram illustrating an example computing device 200 for designing an integrated circuit, in accordance with an embodiment. The computing device 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computing device 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computing device 200. The graphics adapter 212 displays images and other information on the display 218. The network adapter 216 couples the computing device 200 to one or more computer networks.

The computing device 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202. The types of computing devices 200 used can vary depending upon the embodiment and requirements. For example, a computing device may lack displays, keyboards, and/or other devices shown in FIG. 10.

The interactive circuit design system 300 described below in detail with reference to FIG. 3 below may be embodied by the computing device 200.

Example System for Reuse of Layout-Dependent Effects

Figure 3:
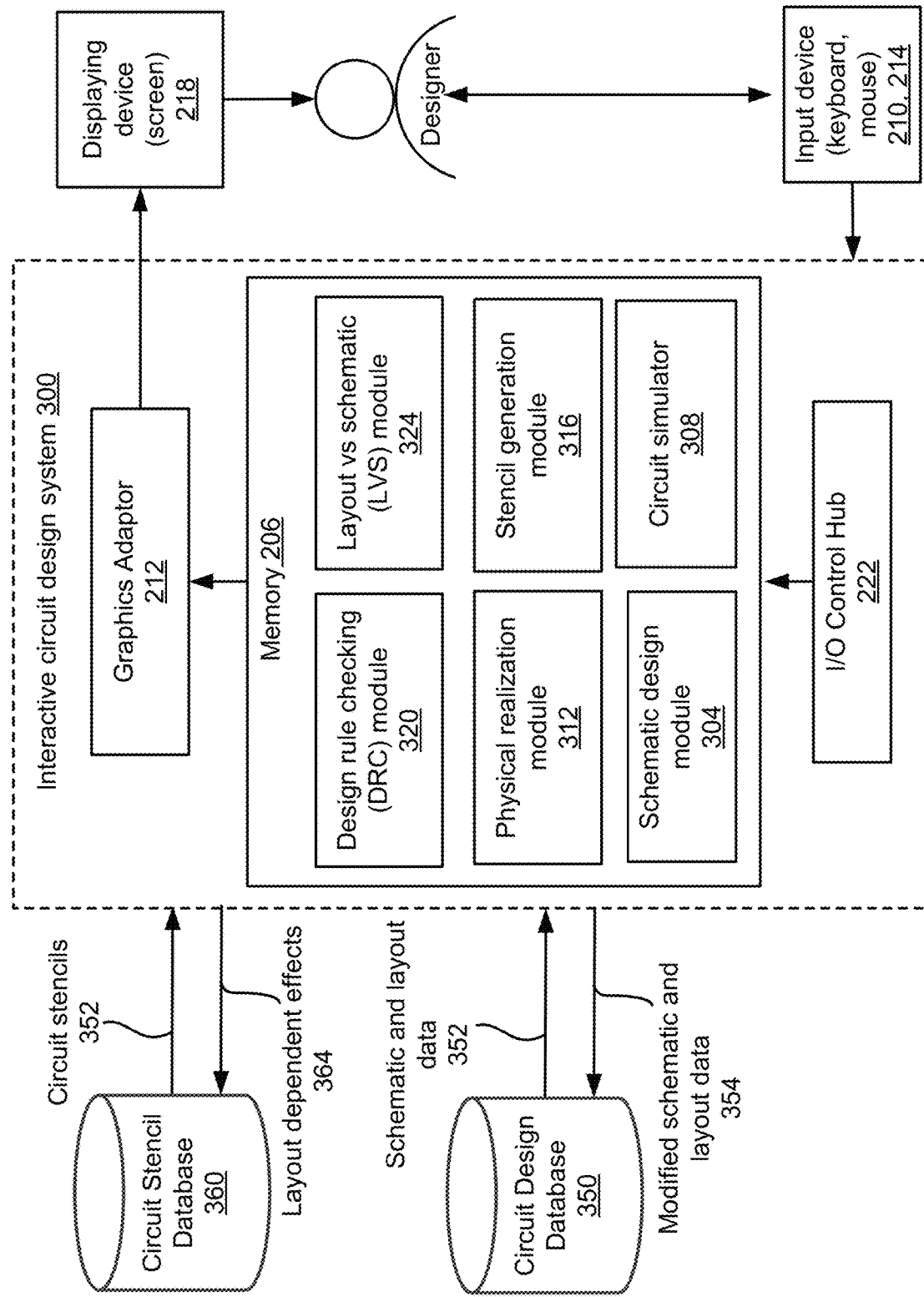
FIG. 3 is a block diagram illustrating an example system for reuse of extracted layout-dependent effects using circuit stencils, according to one embodiment.

FIG. 3 is a block diagram illustrating an example system for reuse of extracted LDE information based on circuit stencils, according to one embodiment. The interactive circuit design system 300 performs, among others, the operation of instantiating and routing components and connections of a circuit interactively by displaying, establishing, and modifying components and connections as the designer inputs are received (instead of batch processing the components and connections after receiving a series of designer inputs without intermediate displaying of components and connections).

For this purpose, the interactive circuit design system 300 communicates with a circuit design database 350 and interacts with a designer via input devices (e.g., keyboard 210, mouse 214) and output devices (e.g., displaying device 218). The designer inputs provided by the designer via the input devices 210, 214 may instruct the interactive circuit design system 300 to instantiate a circuit stencil in a schematic of an integrated circuit, establish or modify connections to or from a circuit segment or between nodes and components of a circuit segment, and display such connections on the display 218.

The circuit design database 350 is a database that interacts with the interactive circuit design system 300 to store schematic and layout data 352, and modified schematic and layout data 354. The physical layout data 352, as used herein, includes physical geometric layout of patterns, schematic-layout mapping information (hereinafter referred to as "the mapping information"), number of metal layers, and physical processes associated with fabricating the circuit. The mapping information may indicate, among others, grouping of nodes in one or more circuit elements into one or more subsets of nodes, and correspondence of nodes or components in the one or more circuit elements to other nodes or components in the one or more circuit elements.

The modified schematic and physical layout data 354 is a version of the circuit data that is modified relative to the original schematic and physical layout data 352 by the interactive circuit design system 300. The physical geometric layout of patterns is a digital representation of a circuit, for example, in GDSII format. The modified schematic and physical layout data 354 includes modified placements, modified schematics, or physical geometric layout of patterns of routed connections not present in the physical geometric layout of patterns in the physical layout data 352. Additional information representing newly generated connections of the circuit may be included in modified physical layout data 354.

The circuit design database 350 may be embodied, for example, as OpenAccess database. Although the circuit design database 350 is described as being a component separate from the interactive circuit design system 300, the circuit design database 350 may be part of the interactive circuit design system 300. For example, the circuit design database 350 may be a module in memory 206.

The interactive circuit design system 300 may include, among other components, an I/O controller hub 222, a memory 206, and graphics adapter 212. The I/O controller hub 222 receives designer input from the input devices 210 and 214 as well as schematic and physical layout data from the circuit design database 350 external to the interactive circuit design system 300, processes the received designer input as well as the received schematic and physical layout data, and provides the processed information to the memory 206.

The memory 206 may include, among other modules, a schematic design module 304, a circuit simulator 308, a physical realization module 312, a stencil generation module 316, a design rule checking (DRC) module 320, and a layout vs schematic (LVS) module 324. The memory 206 may include other software components (e.g., operating system) not illustrated in FIG. 3. The memory 206 may also include only a subset of these modules.

The schematic design module 304 is a software module that creates a representation of the components, nodes, and other elements of an integrated circuit (e.g., the integrated circuit 400 illustrated below with reference to FIG. 4) using abstract, graphic symbols and textual representation. The schematic design module 304 creates a schematic of an integrated circuit using symbols to represent the components and emphasizing their interconnection paths. The schematic design module 304 may include schematic capture tools and schematic entry tools. The schematic design module 304 may be integrated into the whole circuit design flow and linked to other EDA tools for verification and simulation of the circuit. The schematic design module 304 instantiates circuit stencils in a schematic of an integrated circuit during schematic design, as illustrated and described below with reference to FIG. 5.

The circuit simulator 308 is a software module that uses mathematical models to replicate the behavior of an integrated circuit. The circuit simulator 308 may be a strictly analog electronics circuit simulator or may include both analog and event-driven digital simulation capabilities (e.g., mixed-mode simulator). An entire mixed signal analysis can be driven from one integrated schematic. The digital models in the circuit simulator 308 provide specifications of propagation time and rise/fall time delays of components and nodes in the integrated circuit. The schematic design module 304 associates LDE information for circuit segments in the integrated circuit via instantiation of circuit stencils. For example, detailed parasitics for a circuit segment (based on an actual design layout) may be incorporated into a circuit schematic via a circuit stencil for the circuit segment. The circuit simulator 308 allows the re-use of such LDE information in the pre-layout simulation of a target design (such as an amplifier or comparator) in which one or more instances of the circuit stencil are placed.

The physical realization module 312 is a software module that creates a representation of portions of the integrated circuit in terms of planar geometric shapes which correspond to the patterns of metal, oxide, or semiconductor layers that make up the components of the integrated circuit. The physical realization module 312 generates a layout of the integrated circuit based on a schematic and extracts the LDE information for the circuit segment from the layout, as described below with reference to FIG. 4. The physical realization module 312 generates a layout of at least a portion of the integrated circuit responsive to performing the simulation with the LDE information for the circuit segment, where the portion corresponds to the circuit segment.

The stencil generation module 316 is a software module that receives schematic information for a circuit segment and LDE information for a layout of an integrated circuit including the circuit segment. The stencil generation module 316 generates a design abstraction of the circuit segment including a representation of reduced connectivity information for the circuit segment. The stencil generation module 316 extracts LDE information for the circuit segment from the LDE information for the layout of the integrated circuit including the circuit segment to generate a circuit stencil, as illustrated and described below with reference to FIG. 4. The circuit stencils are stored in the circuit stencil database 360. The LDE information 364 and connectivity information in the circuit stencils are sent to the circuit stencil database 360 by the stencil generation module 316. The schematic design module 304 receives circuit stencils 362 from the circuit stencil database 360.

The DRC module 320 is a software module that determines whether a physical layout of a particular chip satisfies a series of design rules. The design rules, as well known in the art, refer to general parameters recommended by semiconductor manufacturers to ensure that proper integrated circuits can be manufactured by the semiconductor manufactures. When the design rules are violated, the DRC module 320 prompts the violation to the designer for corrective actions or automatically modifies the physical layout to comply with the design rules.

The LVS module 324 is a software module that determines whether a particular integrated circuit layout created by the physical realization module 312 corresponds to the schematic of the design created by the schematic design module 304. The LVS module 324 examines the layers drawn to represent the circuit during layout using area-based logic operations to determine the semiconductor components represented in the drawing by their layers of construction. The LVS module 324 combines the extracted components into series and parallel combinations and generates a netlist representation of the layout database. The LVS module 324 performs a similar reduction on the schematic. The LVS module 324 compares the extracted layout netlist to the circuit schematic.

Example Circuit Segment

Figure 4:
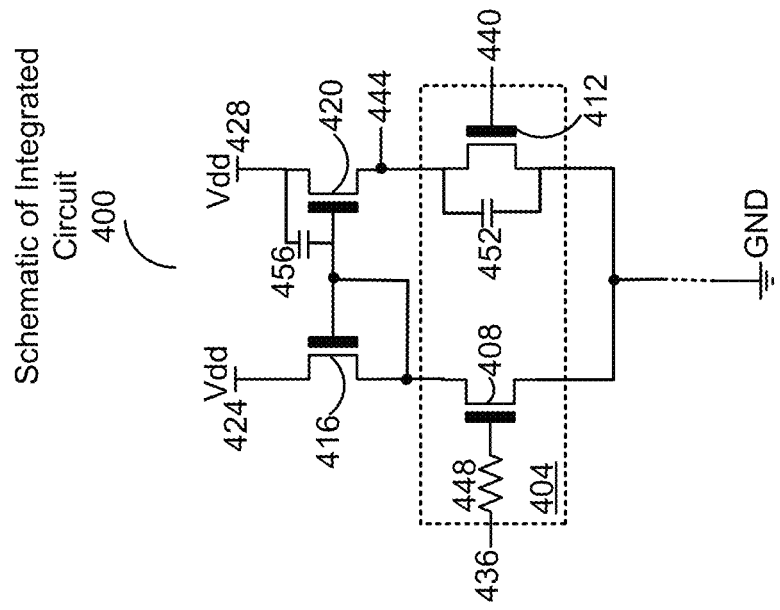
FIG. 4 is a circuit diagram of an example integrated circuit including a circuit segment, in accordance with an embodiment.

FIG. 4 is a circuit diagram of an example integrated circuit 400 including a circuit segment 404, in accordance with an embodiment. The integrated circuit 400 represents an example current mirror-loaded differential amplifier. The nodes 424 and 428 marked "Vdd" provide voltage to the integrated circuit 400. The integrated circuit 400 includes a current mirror made of transistors 416 and 420 which load the differential pair circuit segment 404. The current mirror in the integrated circuit 400 copies a current through one active device by controlling the current in another active device, keeping the output current constant regardless of loading. The differential pair circuit segment 404 is loaded by the current mirror and applies a gain to the difference between the two input signals 436 and 440. The differential pair 404 is made of transistors 408 and 412. Nodes 436 and 440 are the two inputs to the current mirror-loaded differential amplifier 400 and also to the differential pair circuit segment 404. The output node 444 of the integrated circuit 400 produces an amplified version of the differential signal received at input nodes 436 and 440.

As process geometries are reduced, the proximity of nanoscaled devices cause them to interact and create new types of variability called LDE. For example, proximity effects can de-rate transistor currents by 10% or more, or shift threshold voltage (Vt) by several 10 s of mV. LDE information is extracted from an integrated circuit after layout of the components and the required wiring interconnects of the circuit. LVS and layout parasitic extraction (LPE) tools can extract and measure the LDE, placing these values as instance parameters within a file, e.g., as a Detailed Standard Parasitic Format (DSPF) file.

The effects are considered as instance parameters e.g. new parameters that appear on the lines within the instance section of the DSPF file. The purpose of LDE information extraction is to create an accurate analog model of the integrated circuit, such that back-annotation of the LDE information on the schematic and detailed simulations can emulate actual digital and analog circuit responses.

In a typical circuit design flow, circuit design proceeds from schematic design through to a completed LVS and DRC clean layout before parasitics and other LDE information are extracted. The LDE information is then back-annotated to the pre-layout schematic, and a re-simulation is performed to determine the impact of the LDE on the design performance. Here, in embodiments, circuit design efficiency is improved by re-use of circuit stencils, which associate LDE (based on an actual design layout) with a circuit segment (such as a differential pair 404 or current mirror) and then allow the re-use of LDE information in the pre-layout simulation of the circuit design (such as an amplifier 500 illustrated below with reference to FIG. 5 or comparator) in which one or more instances of the circuit stencil is placed.

LDE may include, for example, (i) circuit parasitics, (ii) polysilicon spacing effects (PSE) and polysilicon length effects, (iii) shallow trench isolation (STI) effects and (iv) well proximity effects (WPE). First, the circuit parasitics include interconnect resistance, interconnect capacitance, and interconnect inductance. The example resistance 448 in FIG. 4 represents the parasitic resistance on the input node 436 that has been extracted from a layout of the integrated circuit 400 and back-annotated onto the schematic represented in FIG. 4. The example capacitance 452 in FIG. 4 represents the parasitic drain-to-source capacitance of the transistor 412 that has been extracted from a layout of the integrated circuit 400 and back-annotated onto the schematic represented in FIG. 4. The example capacitance 456 in FIG. 4 represents the parasitic gate-to-drain capacitance of the transistor 420 that has been extracted from a layout of the integrated circuit 400 and back-annotated onto the schematic represented in FIG. 4.

PSE and PLE refer to the length and spacing effects of polysilicon "dummy" gates on uniformity of the devices in the circuit, (e.g., devices 408 and 412 in the embodiment of FIG. 4). PSE and PLE may impact the drain currents in transistors and affect performance of the integrated circuit 400.

STI, also known as box isolation technique, is an integrated circuit design feature, which prevents electric current leakage between adjacent semiconductor device components. STI effects are caused by silicon stress from the isolation of the trenches. The STI design process leaves behind a silicon island that is in a non-uniform state of bi-axial compressive stress. STI may increase electron mobility, thereby increasing the Negative-Channel Metal Oxide Semiconductor (NMOS) current. STI may increase hole mobility, thereby increasing Positive-Channel Metal Oxide Semiconductor (PMOS) current. STI may also impact the Vt of devices.

WPE refers to the proximity of devices (transistors) to the edges of the well. This distance has an effect on the Vt of the devices. The cause is implant ions scattering off the resist sidewall used to define the well, thus increasing Vt by several, or even tens, of millivolts. Other LDE information that may be extracted from the layout of the integrated circuit 400 includes information for length of diffusion effects, near diffusion effects (NDE) (affecting device uniformity and causing device parameter changes), litho rounding effects (creating rounding effects on poly and diffusion corners), etc.

The stencil generation module 316 extracts the LDE information for the circuit segment 404 from the extracted LDE information for the integrated circuit 400 (e.g., in the DSPF file) from the layout of the integrated circuit 400. For example, the stencil generation module 316 may search a path to a DSPF file containing the LDE associated with the integrated circuit 400. In an alternate embodiment, a path to the DSPF file for a higher level design block (i.e. one in which the integrated circuit 400 is itself instantiated, such as a voltage controlled oscillator circuit that instantiates the amplifier of FIG. 4) may be searched instead.

The stencil generation module 316 filters the extracted layout-dependent effects information for the integrated circuit 400 to identify layout-dependent effects information (e.g., capacitance 452) corresponding to components (e.g., transistor 412) and nodes in the circuit segment 404. The stencil generation module 316 filters the extracted layout-dependent effects information for the integrated circuit 400 by parsing the extracted layout-dependent effects information for the integrated circuit 400 to build a parse tree. The parse tree represents the underlying structure of the DSPF file data, stored in a data structure. The stencil generation module 316 traverses the parse tree and removes LDE information (e.g., capacitance 456) not corresponding to components and nodes in the circuit segment 404. Generating the circuit stencil includes normalizing names of components and nodes of the circuit segment for inclusion in the circuit stencil, as described below in detail.

The stencil generation module 316 may read in a DSPF file for the integrated circuit 400 and filter it down to only the information associated with the components and nodes of the circuit segment 404. The original DSPF file may contain LDE information for all the nets of the integrated circuit 400. In an embodiment, LDE information for the power network mesh may also be filtered. The stencil generation module 316 identifies and removes the nodes not electrically connected to the selected circuit segment nodes (either directly or indirectly via a parasitic resistance network). The remaining sub-nodes and elements (e.g., resistance 448 and capacitance 452) have their names normalized and 'uniquified' as appropriate by the name normalization method described below.

The stencil generation module 316 initializes two lists in the parse tree traversal process, one for node information, and one for component information. Each line of the DSPF file is then parsed, and if the line is a node line (that also matches any optionally specified component specification), a new node data structure is initialized and added to the list of nodes. This new structure is also tagged as the current node structure. If the line is not a node line, but it is within the component section of the DSPF file, then it is parsed as a component line, and the parse information appended to the list of components (when the optionally specified component specification is supplied, only those components that match this specification are appended). If it is not a component line, then it is parsed as a node element item, such as a sub-node, component pin, or parasitic R or C element, and its parse tree is appended to the currently tagged node structure (again, the optionally specified component specification is first used as a filter). The node element details (sub-nodes, instance pins, and parasitics) for each node are associated with the node itself in a data structure, and any optional component specification filtering has already been applied.

The stencil generation module 316 iterates over the node structures created during the parse process above. As each node is encountered, it is inspected to see if it is of interest. A node is "of interest" if it is associated with the direct interconnect of any of the components of the stencil. If the node is not associated with such a direct interconnect (e.g., nodes 424 or 428 in FIG. 4 below), it is not of interest. If the node is of interest, the node is normalized (its name replaced with the corresponding value in the node map) and written to the stencil, and the process continues to the node elements which are associated with that node. Each node element is inspected to see if its fields are of interest, and if so the 'stencilization' is applied again to those node fields before writing to the stencil. Further, resistor and capacitor elements are uniquified via appending of a string to their instance names before writing to the stencil. When all the nodes are exhausted, the components are traversed. Each component of interest is considered, and its instance name normalized with the corresponding value from the instance name map before writing to the stencil. In addition, its node fields are also compared with the net name map, and stenciled as for any other node item.

The stencil generation module 316 may extract layer map information from the layout of the integrated circuit 400 and write the layer map information into the circuit stencil. Semiconductor layer map information refers to parameters of the material layers used to fabricate a particular process, e.g., a 22 nm or 12 nm process. The layers may include bulk material, e.g., Si, Ge, GaAs, dopants to create p- and n-type regions, and metallization to make contacts. The layer map information provides physical information, for example a mapping from layer sheet resistivity in the process used to realize the integrated circuit 400 design to the corresponding layer sheet resistivity in the process used to realize a later target design. This allows for the LDE stencils to be 'ported' from one process to another.

Example Instantiation of Circuit Stencil into Integrated Circuit

Figure 5:
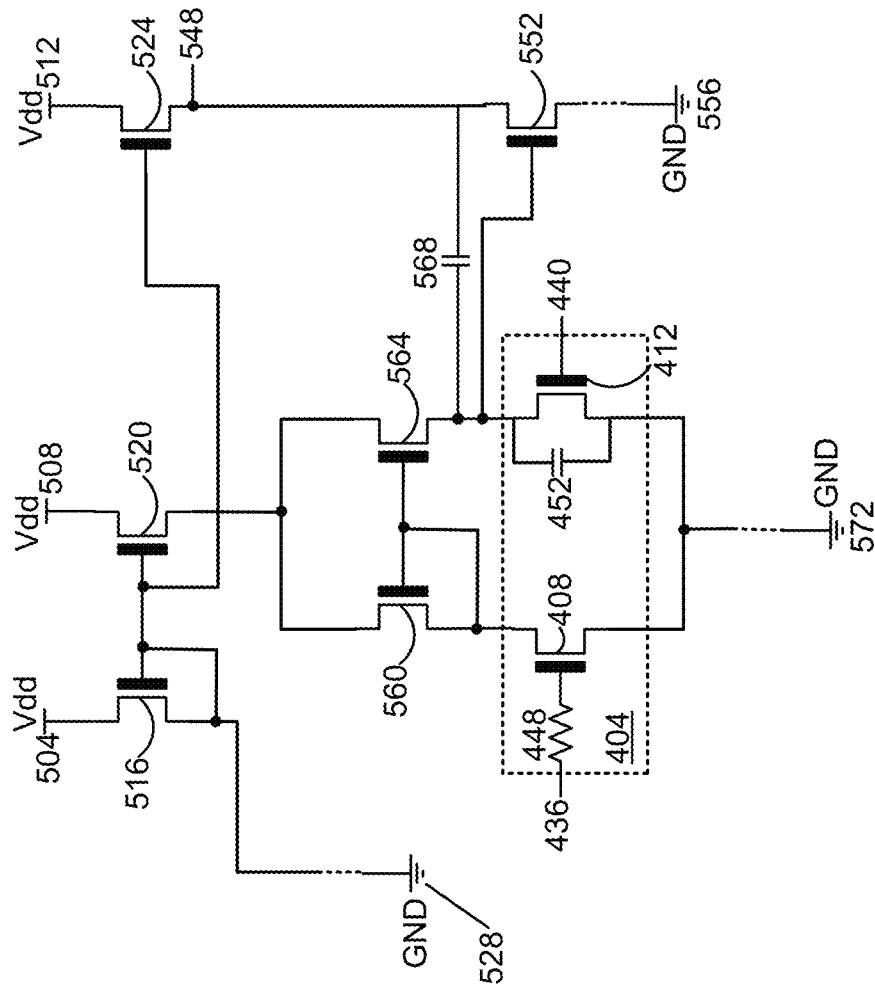
FIG. 5 is a circuit diagram illustrating instantiation of a circuit stencil from FIG. 4 into an example integrated circuit, in accordance with an embodiment.

FIG. 5 is a circuit diagram illustrating instantiation of a circuit stencil for circuit segment 404 from FIG. 4 above into an example integrated circuit 500, in accordance with an embodiment. FIG. 5 illustrates a portion of an example multistage opamp. The integrated circuit 500 uses the Vdd power supplies 504, 508, and 512. Nodes 528, 572, and 556 in the integrated circuit 500 are grounded. The current mirror formed by transistors 516 and 520 supplies the integrated circuit 500 with bias current. The integrated circuit 500 instantiates a current mirror formed by transistors 560 and 564, which actively load the circuit segment 404. The inputs to the integrated circuit 500 are nodes 436 and 440. The second stage of the integrated circuit 500 consists of transistor 552, which is a common source amplifier actively loaded with the current source transistor 524. A capacitor 568 is included in the negative feedback path of the second stage. The output of the integrated circuit 500 is node 548.

The circuit segment 404 is created in the schematic of the integrated circuit 500 by instantiating the stencil for the circuit segment 404 illustrated above in FIG. 4. The circuit segment 404 includes the transistors 408 and 412. The LDE information (resistance 448 and capacitance 452) in the stencil for the circuit segment 404 from FIG. 4 is referenced in the schematic for the integrated circuit 500, as shown in FIG. 5.

Instantiating the stencil for the circuit segment 404 from FIG. 4 above into the schematic of the integrated circuit 500 in FIG. 5 includes generating a mapping for the schematic of the integrated circuit 500 in FIG. 5. The mapping associates actual names of components and nodes in the schematic of the integrated circuit 500 in FIG. 5 with normalized names in the circuit stencil as follows. As the stencil for the circuit segment 404 is instantiated in the schematic of the integrated circuit 500, a component and node map are generated for it, and annotated as properties 354 in the schematic database 350, illustrated above with reference to FIG. 3. The mapping is from the actual placed names in the schematic of the integrated circuit 500 to the normalized names (e.g., 408 and 412) which are stored as part of the stencil definition in the circuit stencil database 360, illustrated above with reference to FIG. 3. For convenience, reverse component and node name maps may also be generated and annotated onto the placed stencil container objects in the database 360.

In an alternative embodiment, instead of instantiating the stencil for the circuit segment 404 from FIG. 4 above into the schematic of the integrated circuit 500, simulation is performed on the schematic of the integrated circuit 500 by at least referencing the LDE information for the circuit segment 404 in the circuit stencil corresponding to the circuit segment 404.

The schematic design module 304 uses the raw LDE information in the circuit stencil for circuit segment 404 to produce one or more actual valid DSPF files, with the integrated circuit 500 design node and component names substituted in place of the normalized names thus correctly establishing the parasitic connectivity for each individual placed stencil instance. Unique values are also substituted in for the parasitic element R and C) terms (e.g., resistance 448 and capacitance 452 to ensure unique parasitics are placed when there are multiple rendered stencils. The primary inputs to the stencil instantiation process include the circuit stencils and the node and component name maps. The input node name map consists of a mapping from the normalized stencil names to the actual target net names. Similarly, the input component name map consists of a mapping from the normalized component names to the actual target component names. A unique identifier may also be generated for each stencil instance, in order to 'uniquify' the parasitic component names. The resulting DSPF file may also be prefixed with a standard DSPF file header in order to identify its contents to the circuit simulator 308.

In an embodiment, instantiating the circuit stencil for the circuit segment 404 in the schematic of the integrated circuit 500 includes rescaling the layout-dependent effects information for the circuit segment 404 in the circuit stencil using layer map information in the circuit stencil and manufacturing information including layer-specific factors for the second integrated circuit. The manufacturing information may include parameters for the metal layers, field oxide, n-wells, gate oxide, polysilicon, nitride, etc. For example, the values of the parasitic resistances (e.g., resistance 448) may be scaled by calculating the sheet resistance ratios from the layer map information, and multiplying the original resistance values by the appropriate layer-specific ratio factor. The schematic design module 304 produces fully rendered DSPF files as an output of the schematic design process including stencils.

In one embodiment, a single DSPF file is produced for each placed stencil instance. In an alternative embodiment, a single DSPF file is produced for the cell containing all the stencil instances. In this case, all the rendered DSPF contents may be concatenated together into a single container. In another embodiment, a DSPF file is produced on a per-stencil basis, in which all instances of that particular stencil are represented. For example, one DSPF file is produced which contains the LDE information for all differential-pair stencil instances, another for all the current mirror instances, a third for all cascode stage instances, etc. Other partitionings/combinations can equally be generated (e.g., all stencils with NMOS components in one DSPF file, all stencils with PMOS components in another DSPF file, etc.) without departing from the spirit of the art.

Finally, the rendered DSPF files are made available to the schematic design module 304, allowing the designer to selectively choose which to back annotate (or not) onto the pre-layout schematic.

In an embodiment, the circuit segment 404 may correspond to one or more circuit stencils. Each such circuit stencil corresponds to a distinct physical implementation of the circuit segment 404. For example, the different physical implementations may correspond to different planar geometric shapes which correspond to different patterns of metal, oxide, or semiconductor layers that make up the components of the circuit segment 404. The behavior of the final integrated circuit depends on the positions and interconnections of the geometric shapes. The different physical implementations may be designed to meet different criteria in terms of performance, size, density, and manufacturability. The circuit simulator 308 may perform simulations on different schematics of the integrated circuit 500 using LDE information in the different circuit stencils for each circuit stencil corresponding to the circuit segment 404. The schematic design module 304 may select one of the circuit stencils based on the simulations for updating the schematic of the integrated circuit 500.

In an alternative embodiment, the layout for the circuit segment 404 may have been authored using a schematic-driven-layout (SDL) flow. The stencil generation module 316 receives the layout of the circuit segment 404. In this case, selection of the schematic circuit segment 404 shapes in the schematic design module 304 also allows for the corresponding selection of the related layout source design shapes in the physical realization module 312, due to the correspondence map maintained by the physical realization module 312 during SDL. A new layout template view is generated in which these layout shapes are respectively placed. Since there is a full SDL correspondence available from the circuit segment 404 schematic and layout views, a corresponding full correspondence is quickly constructed from the schematic to newly created layout template views. The new layout can be finalized and passed through existing LVS, DRC, and LDE extraction flows as illustrated above with reference to FIG. 1. The resulting extracted DSPF file can then be passed as an input to the stencil generation process.

In one embodiment, the schematic of the integrated circuit 500 may be modified after performing simulation on the schematic of the integrated circuit 500. For example, the schematic of the integrated circuit 500 may be modified when the re-use of the circuit stencil for segment 404 reveals a design flaw in the integrated circuit 500 during simulation.

The benefits and advantages of the claimed embodiments include increased efficiency across the circuit design flow by providing 'assistive' automation via the use of circuit stencils, the benefits of hierarchy and hierarchical design without imposing the user burden of dealing with hierarchical interfaces, and reduced design iterations and turnaround time.

Example Process for Reuse of Layout-Dependent Effects

Figure 6:
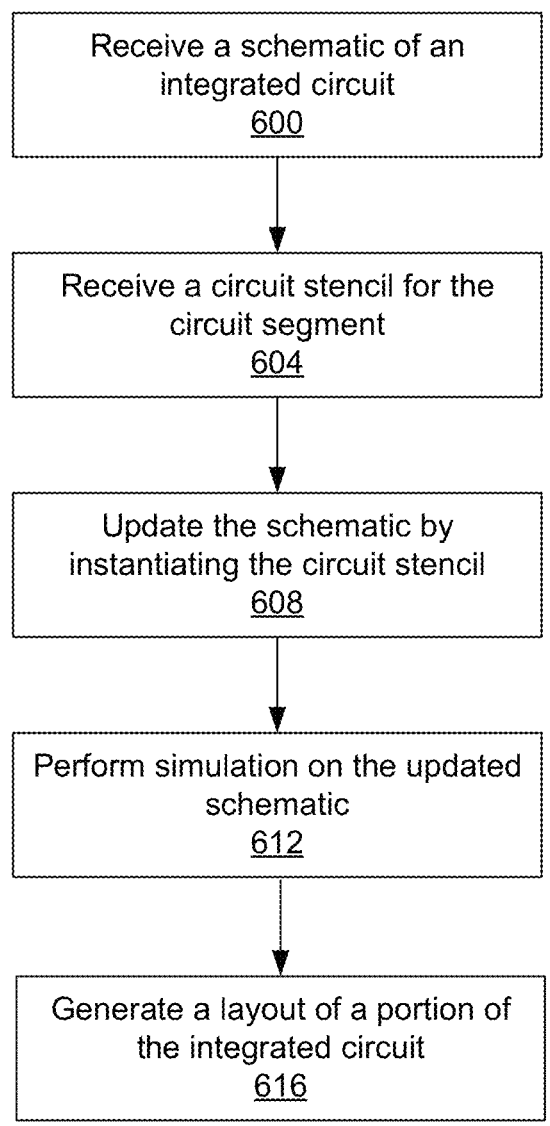
FIG. 6 is a flowchart illustrating a process for reuse of extracted layout-dependent effects using circuit stencils, in accordance with an embodiment.

FIG. 6 is a flowchart illustrating a process for reuse of extracted layout-dependent effects using circuit stencils, in accordance with an embodiment. In some example embodiments, the process may have different and/or additional steps than those described in conjunction with FIG. 6. Steps of the process may also be performed in different orders than the order described in conjunction with FIG. 6. Some steps may be executed in parallel. Alternatively, some of the steps may be executed in parallel and some steps executed sequentially. Alternatively, some steps may execute in a pipelined fashion such that execution of a step is started before the execution of a previous step.

The schematic design module 304 receives 600 a schematic of an integrated circuit (e.g., integrated circuit 500) including a circuit segment (e.g., circuit segment 404) from the circuit design database 350. The schematic design module 304 receives 604 a circuit stencil corresponding to the circuit segment 404 from the circuit stencil database 360. The circuit stencil includes LDE information for the circuit segment 404 extracted from a layout of an integrated circuit (e.g., integrated circuit 400).

The schematic design module 304 updates 608 the schematic of the integrated circuit 500 by instantiating the circuit stencil in the schematic. The circuit simulator 308 performs simulation on the updated schematic using the LDE information for the circuit segment 404 without generating an updated layout of the integrated circuit 500. The physical realization module 312 generates a layout of at least a portion of the integrated circuit 500 using the updated schematic responsive to performing the simulation. The portion corresponds to the circuit segment 404.

The foregoing description of the embodiments has been presented for the purpose of illustration; it is not intended to be exhaustive or to limit the invention to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A computer-implemented method, comprising:
   receiving layout-dependent effects information for an integrated circuit comprising a plurality of circuit segments having a plurality of components and nodes;
   generating a circuit stencil representing an abstracted version of a circuit segment of the plurality of circuit segments by at least parsing the layout-dependent effects information for the integrated circuit and removing layout-dependent effects information not corresponding to a subset of the components and nodes associated with the circuit segment;
   writing remaining layout-dependent effects information into the circuit stencil;
   instantiating the circuit stencil in a schematic of another integrated circuit;
   performing simulation on the schematic using layout-dependent effects information corresponding to the subset of components and nodes of the circuit segment to generate performance information for the other integrated circuit, the performance information comprising propagation time and delays associated with components and nodes of the other integrated circuit; and
   responsive to performing the simulation, generating a layout of at least a portion of the other integrated circuit corresponding to the circuit stencil.

2. The computer-implemented method of claim 1, further comprising:
   receiving a selection of a portion of layout-dependent effects information for the other integrated circuit; and back annotating the portion of the layout-dependent effects information for the other integrated circuit onto the schematic.

3. The computer-implemented method of claim 1, wherein the generating the circuit stencil further comprises:
receiving connectivity information for the circuit segment indicating connections between the subset of the components and nodes associated with the circuit segment;
collapsing the connectivity information to generate reduced connectivity information by analyzing functionality of the circuit segment and removing or replacing at least one redundant component or node without modifying the functionality, the reduced connectivity information representing a logically compacted version of the connectivity information; and
writing the reduced connectivity information into the circuit stencil.

4. The computer-implemented method of claim 1, wherein the generating the circuit stencil further comprises:
identifying a component of the circuit segment having a parameter value matching an aggregate expression including a parameter value of another component of the circuit segment; and
replacing the parameter value of the identified component with the aggregate expression for inclusion in the circuit stencil.

5. The computer-implemented method of claim 1, wherein generating the circuit stencil further comprises:
parsing the layout-dependent effects information for the integrated circuit to build a parse tree; and
traversing the parse tree and removing layout-dependent effects information not corresponding to components and nodes of the circuit segment to obtain the remaining layout-dependent effects information.

6. The computer-implemented method of claim 1, wherein generating the circuit stencil further comprises:
identifying and removing nodes of the integrated circuit that are not electrically connected to nodes of the circuit segment.

7. The computer-implemented method of claim 1, wherein generating the circuit stencil further comprises:
generating a layout of the integrated circuit; and
extracting the layout-dependent effects information for the circuit segment from the layout.

8. The computer-implemented method of claim 1, wherein the instantiating of the circuit stencil comprises generating a mapping for the schematic, the mapping associating actual names of components and nodes of the schematic with normalized names in the circuit stencil.

9. The computer-implemented method of claim 1, wherein the instantiating of the circuit stencil comprises resealing the remaining layout-dependent effects information by multiplying the remaining layout-dependent effects information by layer-specific factors for the integrated circuit.

10. The computer-implemented method of claim 1, wherein the circuit segment corresponds to one or more circuit stencils, each circuit stencil corresponding to a distinct physical implementation of the circuit segment.

11. The computer-implemented method of claim 10, further comprising:
for each circuit stencil corresponding to the circuit segment, performing simulation on the schematic using the remaining layout-dependent effects information in the circuit stencil; and
selecting one of the one or more circuit stencils based on the simulations for instantiating the selected circuit stencil in the schematic.

12. The computer-implemented method of claim 1, wherein the instantiating of the circuit stencil comprises:
generating layout-dependent effects information for the schematic from the remaining layout-dependent effects information for the circuit segment present in the circuit stencil; and
back annotating the generated layout-dependent effects information onto the schematic.

13. A non-transitory computer-readable storage medium storing instructions thereon, the instructions when executed by a processor cause the processor to:
receive layout-dependent effects information for an integrated circuit comprising a plurality of circuit segments having a plurality of components and nodes;
generate a circuit stencil representing an abstracted version of a circuit segment of the plurality of circuit segments by at least parsing the layout-dependent effects information for the integrated circuit and removing layout-dependent effects information not corresponding to a subset of the components and nodes associated with the circuit segment;
write remaining layout-dependent effects information into the circuit stencil;
instantiate the circuit stencil in a schematic of another integrated circuit;
perform simulation on the schematic using layout-dependent effects information corresponding to the subset of components and nodes of the circuit segment to generate performance information for the other integrated circuit, the performance information comprising propagation time and delays associated with components and nodes of the other integrated circuit; and
responsive to performing the simulation, generate a layout of at least a portion of the other integrated circuit corresponding to the circuit stencil.

14. The non-transitory computer-readable storage medium of claim 13, further storing instructions that cause the processor to generate the circuit stencil by:
receiving connectivity information for the circuit segment indicating connections between the subset of the components and nodes associated with the circuit segment;
collapsing the connectivity information to generate reduced connectivity information by analyzing functionality of the circuit segment and removing or replacing at least one redundant component or node without modifying the functionality, the reduced connectivity information representing a logically compacted version of the connectivity information; and
writing the reduced connectivity information into the circuit stencil.

15. The non-transitory computer-readable storage medium of claim 13, further storing instructions that cause the processor to:
identify and remove nodes of the other integrated circuit that are not electrically connected to nodes of the circuit segment.

16. The non-transitory computer-readable storage medium of claim 13, further storing instructions that cause the processor to:
generate layout-dependent effects information for the schematic from the remaining layout-dependent effects information for the circuit segment present in the circuit stencil; and back annotate the generated layout-dependent effects information onto the schematic.

17. The non-transitory computer-readable storage medium of claim 13, further storing instructions that cause the processor to:
identify a component of the circuit segment having a parameter value matching an aggregate expression including a parameter value of another component of the circuit segment; and
replace the parameter value of the identified component with the aggregate expression for inclusion in the circuit stencil.

* * * * *